(12) United States Patent
Metzger et al.

(10) Patent No.: US 8,684,119 B2
(45) Date of Patent: Apr. 1, 2014

(54) LAYOUT OF COMPACT ALL TERRAIN VEHICLE FOR BATTERY POSITIONING

(75) Inventors: Andrew Metzger, Newnan, GA (US); Bryan Harper, Newnan, GA (US)

(73) Assignees: Yamaha Motor Manufacturing Corporation of America, Newnan, GA (US); Yamaha Hatsudoki Kabushiki Kaisha, Shizuoka (JP)

( * ) Notice: Subject to any disclaimer, the term of this patent is extended or adjusted under 35 U.S.C. 154(b) by 703 days.

(21) Appl. No.: 12/616,278

(22) Filed: Nov. 11, 2009

(65) Prior Publication Data

US 2011/0108342 A1   May 12, 2011

(51) Int. Cl.
  *B60R 16/04*   (2006.01)
(52) U.S. Cl.
  USPC ............................. 180/68.5; 180/21; 180/908
(58) Field of Classification Search
  USPC .......................................... 180/68.5, 21, 908
  See application file for complete search history.

(56) References Cited

U.S. PATENT DOCUMENTS

| | | | |
|---|---|---|---|
| 2006/0219452 A1* | 10/2006 | Okada et al. ................. | 180/68.5 |
| 2007/0045015 A1* | 3/2007 | Yamamoto et al. .......... | 180/68.5 |
| 2008/0006463 A1* | 1/2008 | Oohashi ........................ | 180/219 |
| 2008/0257632 A1* | 10/2008 | Takeshima et al. ........... | 180/312 |
| 2008/0308337 A1* | 12/2008 | Ishida ........................... | 180/230 |

* cited by examiner

*Primary Examiner* — Hau Phan
*Assistant Examiner* — Bryan Evans
(74) *Attorney, Agent, or Firm* — Keating & Bennett, LLP (57) ABSTRACT

A battery is arranged so as to be located between left and right frame members in plan view of the vehicle and to the rear of the cylinder with respect to the front-back direction of the vehicle and so as to overlap at least a portion of the transmission case with regard to the location of at least a portion of the battery in the front-back direction of the vehicle, the long side of the battery being furthermore oriented in the front-back direction of the vehicle and the short side of the battery being oriented in the widthwise direction of the vehicle.

9 Claims, 11 Drawing Sheets

LAYOUT OF COMPACT ALL TERRAIN VEHICLE FOR BATTERY POSITIONING

BACKGROUND OF THE INVENTION

1. Technical Field

The present invention relates to a compact all terrain vehicle, and more specifically to an improvement of the battery layout.

2. Background Art

A compact all terrain vehicle is disclosed for instance in Japanese Unexamined Patent Application Publication 2006-027425. In this compact vehicle, an engine unit equipped with a V-belt type automatic transmission is mounted between the front and rear wheels and below the seat, and platform style footrests are arranged on the left and right sides of the seat. An electric power steering system, an electronic fuel injection system and the like are also provided.

There is demand in the market for vehicles equipped with more sophisticated accessories of various types while having a compact body. As a result, there has been a tendency for an increase in electrical accessories using a battery as a power source, so batteries having an adequate capacity for this purpose are required. Generally, in vehicles of this type, batteries are arranged forward of the steering handlebar or between the left and right rear wheels.

However, when battery capacity is increased, the weight and size of the battery also increase accordingly. As a result, battery layout has become a struggle when designing the vehicles, so there is a need for the battery to be laid out appropriately without leading to an increase in body size.

SUMMARY OF THE INVENTION

The present invention provides an all terrain vehicle which allows a battery of large capacity, that would enable the use of various types of electrical accessories, to be installed while keeping the body compact.

The present invention is an all terrain vehicle that includes: a pair of left and right front wheels; a pair of left and right rear wheels; an engine unit including a crankcase arranged between the front wheels and said rear wheels in the front-back direction of the vehicle, a cylinder extending upward from the crankcase, and a transmission case housing which is provided to the side of the crankcase in the widthwise direction of the vehicle and houses a V-belt type automatic transmission; a seat arranged so as to be located above the engine unit; footrests arranged so as to be located on both the left and right sides of the engine unit in the widthwise direction of the vehicle; a vehicle body frame which supports the front wheels, the rear wheels, the engine unit and the footrests and has left and right frame members whereof at least a portion extends below the seat in the front-back direction of the vehicle; and a battery which is located between the left and right frame members in plan view of the vehicle and to the rear of the cylinder in the front-back direction of the vehicle, and is arranged at a location where at least a portion of the battery overlaps the transmission case with regard to the location in the front-back direction of the vehicle, with the long side of the battery being oriented in the front-back direction of the vehicle and the short side of the battery being oriented in the widthwise direction of the vehicle.

In one embodiment, the battery is arranged so as to be located between the left and right frame members to the rear of the vehicle from the cylinder, and such that at least a portion of the battery, with regard to its location in the front-back direction of the vehicle, overlaps the transmission case, with the long side of the battery being oriented in the front-back direction of the vehicle and the short side being oriented in the widthwise direction of the vehicle. Thus, it becomes possible to install a large capacity battery, which makes various types of electrical accessories possible, while having a compact body.

Reducing the widthwise dimension of the vehicle in the seating section of the seat to as narrow as possible is desired for creating a compact body. However, the engine unit is arranged below the seat, and an exhaust duct and exhaust pipe, which are engine related parts, are arranged extending in the front-back direction of the vehicle, and footrests are provided so as to be located to the left and right sides of the engine unit. Therefore, space for arranging a battery is limited in the seating section of the seat.

Noting that batteries form a rectangular parallelepiped in plan view, with one side being shorter than the other, the battery may be arranged with the short side oriented in the widthwise direction of the vehicle and the long side oriented in the front-back direction of the vehicle, and with at least a portion of the battery overlapping the transmission case with regard to the location in the front-back direction of the vehicle. Accordingly, the need to substantially widen the gap between the left and right frame members in the widthwise direction of the vehicle is reduced, even if the battery is arranged between those left and right frame members, allowing a compact body to be achieved as a result.

DETAILED DESCRIPTION

Embodiments of the present invention will be described below with reference to the drawings. FIGS. 1 through 11 are drawings illustrating a vehicle according to an embodiment of the present invention. In the present specification, unless indicated otherwise, front, back, left and right signify the front, back, left and right as viewed while sitting on the seat.

In one embodiment, the compact all terrain vehicle 1 includes a vehicle body frame 2, a pair of left and right front wheels 3a, 3b arranged at the front of the vehicle body frame 2 and a pair of rear wheels 4a, 4b arranged at the rear; an engine unit 5 mounted between the front wheels 3a, 3b and the rear wheels 4a, 4b in the front-back direction of the vehicle body frame 2; a saddle seat 6 arranged over the engine unit 5; and platform style footrests 7a, 7b arranged on the left and right sides of the engine unit 5 in the widthwise direction of the vehicle.

Furthermore, the vehicle 1 includes a handlebar member 8 arranged to the front of the vehicle from the seat 6 so as to allow turning to the left and right, an air cleaner 9 arranged above the engine unit 5 of the vehicle body frame 2, and a fuel tank 10 arranged between the left and right rear wheels 4a, 4b on the vehicle body frame 2.

The left and right front wheels 3a, 3b are suspended and supported so as to be vertically slidable on the vehicle body frame 2 by means of front suspensions 38. The left and right rear wheels 4a, 4b are suspended and supported so as to be vertically slidable on the vehicle body frame 2 by means of rear suspensions 39 (see FIG. 5). In one embodiment, low pressure wide balloon tires are installed on the left and right front wheels 3a, 3b and rear wheels 4a, 4b.

Figure 5:
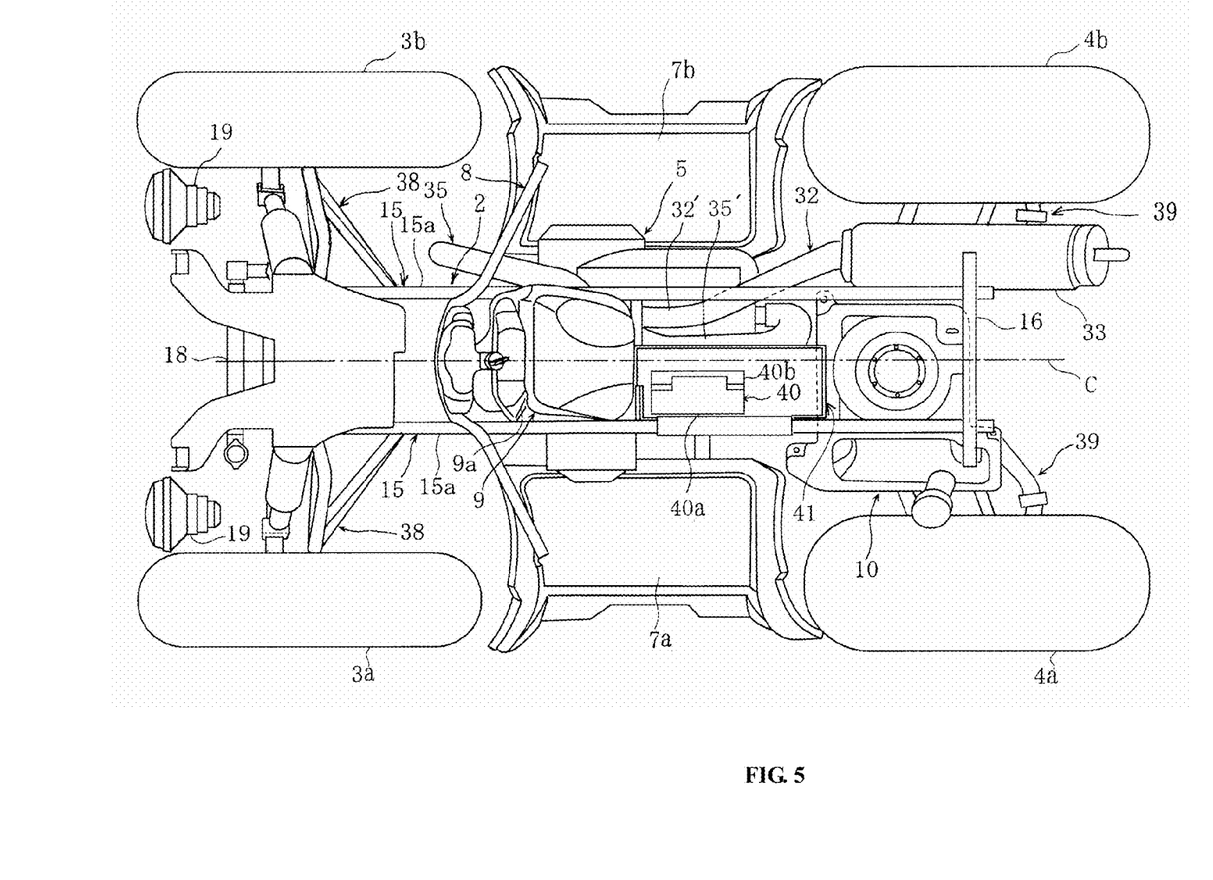
FIG. 5 is a plan view of said vehicle in a state where the vehicle body cover, front and rear fenders and the like have been removed.
Figure 6:
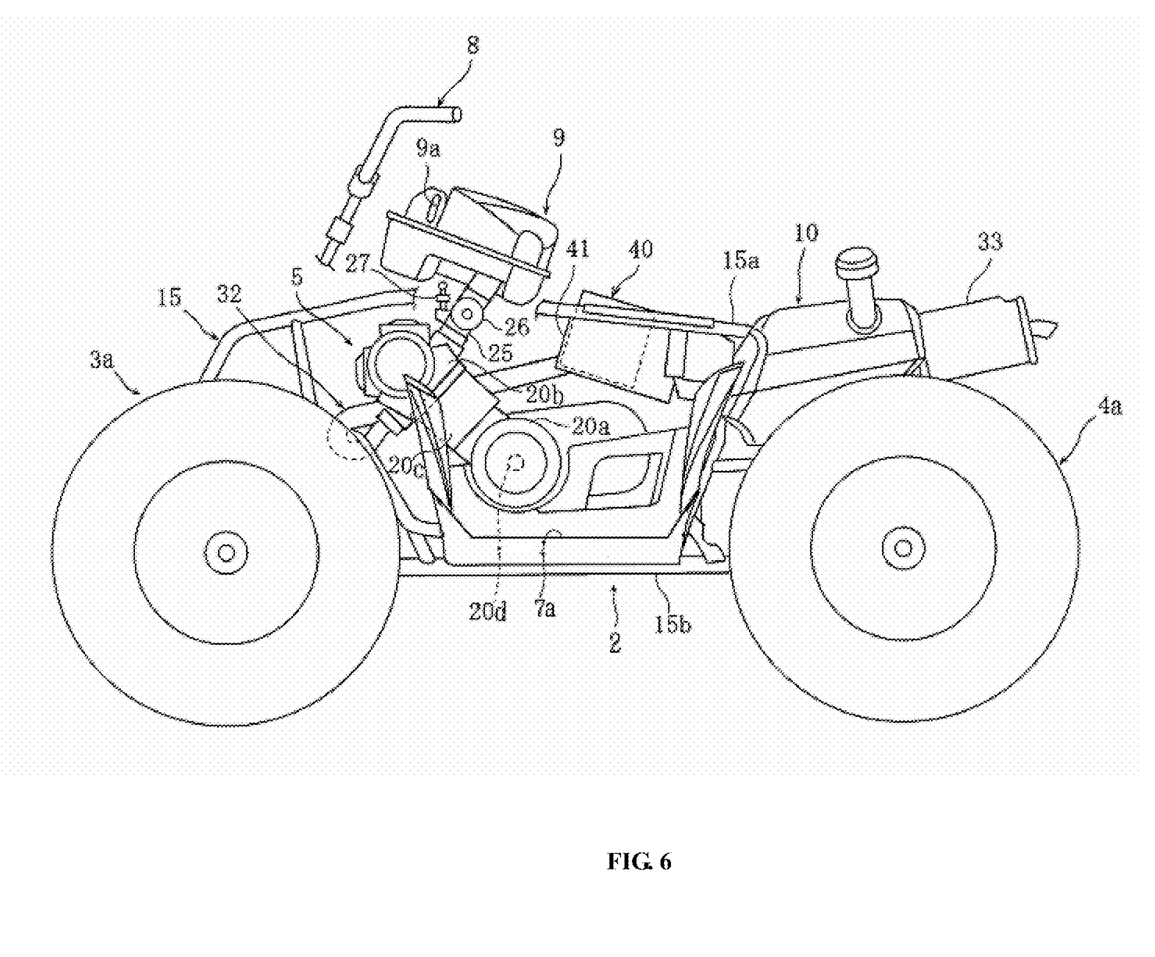
FIG. 6 is a left side view of the engine unit mounted on the vehicle body frame of said vehicle.
Figure 7:
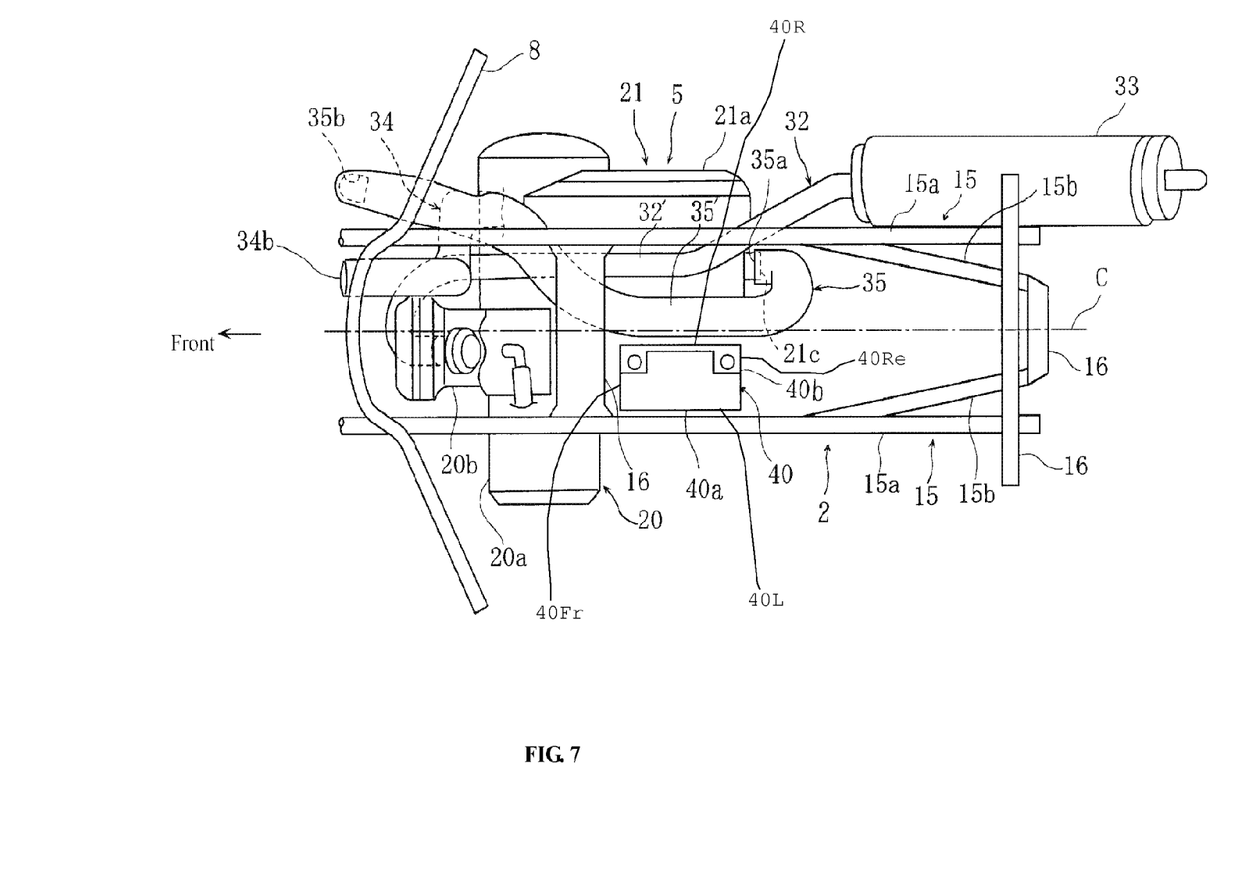
FIG. 7 is a plan view of said engine unit.
Figure 8:
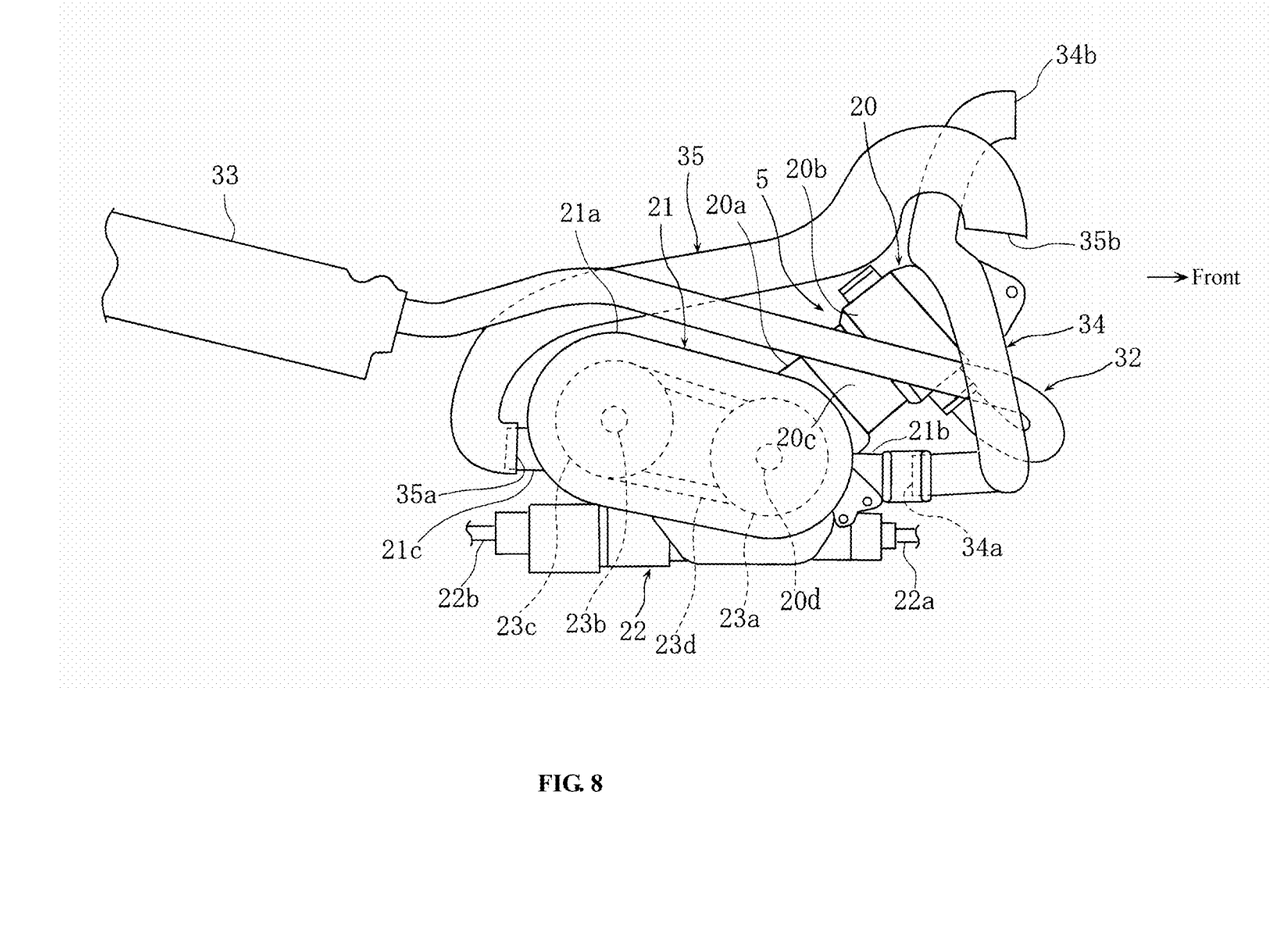
FIG. 8 is a right side view of said engine unit.

A pair of left and right front fenders 12 which cover the left and right front wheels 3a, 3b and a pair of left and right rear fenders 13 which cover the left and right rear wheels 4a, 4b are attached to the vehicle body frame 2. Note that in FIG. 5, illustration of the left and right front fenders and left and right rear fenders has been omitted.

Furthermore, a vehicle body cover 14 which covers the area below and around the seat 6, as well as covering the space between the left and right front fenders 12 containing the air cleaner 9, is attached to the vehicle body frame 2. A service opening 14a, which is opened and closed by the seat 6, is formed in the vehicle body cover 14 below the seat 6 (see FIG. 3).

A radiator 18 is arranged on the front part of the vehicle body frame 2, and a pair of left and right headlights 19 is arranged in front of the radiator 18.

The vehicle body frame 2 includes a pair of left and right steel tube frame members 15 extending in the front-back direction of the vehicle and multiple cross members 16 which extend in the widthwise direction of the vehicle and join the left and right frame members 15 to each other.

The left and right frame members 15 are substantially symmetrical between left and right. Each frame member 15 includes an upper frame 15a which extends in the front-back direction of the vehicle below the seat 6, and an underframe 15b which extends in the front-back direction of the vehicle below the engine unit 5. The front part of the upper frame 15a and underframe 15b is connected by a front suspension pipe 15f and front pipe 15c, and the rear part is connected by an intermediate pipe 15d and rear pipe 15e. The intermediate pipe 15d and rear pipe 15e are further connected by a rear suspension pipe 15g. 15h, 15i and 15j are reinforcing members.

Footrest brackets 17 which support the footrests 7a, 7b are connected to the middle part, with regard to the front-back direction, of the left and right underframes 15b so as to project outward in the widthwise direction of the vehicle.

In one embodiment, the engine unit 5 has a structure wherein a water cooled four cycle single cylinder type engine 20 and a V-belt type automatic transmission 21 are integrally connected.

The engine 20 includes a crankcase 20a which houses a crankshaft 20d oriented horizontally in the widthwise direction of the vehicle, and a cylinder body 20c and cylinder head 20b connected to the crankcase 20a so as to extend diagonally upward.

The automatic transmission 21 is housed in a transmission case 21a connected to the right side of the crankcase 20a with regard to the widthwise direction of the vehicle. The automatic transmission 21 has a structure wherein a drive pulley 23a mounted on the crankshaft 20d and a follower pulley 23c mounted on a follower shaft 23b are coupled by a V-belt 23d. The transmission case 21a has a front edge defining a front transmission case plane 21Fr and a rear edge defining a rear transmission case plane 21Re which each extends in a vertical direction.

A front wheel drive shaft 22a extending toward the front of the vehicle and a rear wheel drive shaft 22b extending toward the rear of the vehicle are coupled to the follower shaft 23b of the automatic transmission 21 via a power transmission mechanism 22.

The front wheel drive shaft 22a is coupled to the left and right front wheels 3a, 3b by means of a front gear unit 30 and rotationally drives the front wheels 3a, 3b. Furthermore, the rear wheel drive shaft 22b is coupled to the left and right rear wheels 4a, 4b by a rear gear unit 31 including a wet brake 45 and rotationally drives the rear wheels 4a, 4b (see FIG. 4).

An air intake tube 25 is connected to the rear wall of the cylinder head 20b of the engine 20. The air intake tube 25 is arranged between the left and right frame members 15 and extends substantially vertically upward from the cylinder head 20b. A throttle body 26 is installed midway in the air intake tube 25, and an air cleaner 9 is connected to the upstream end of the air intake tube 25 (see FIG. 6).

A fuel injection valve 27 is installed in the throttle body 26. This fuel injection valve 27 injects and supplies high pressure fuel from a fuel pump (not illustrated) arranged inside the fuel tank 10 into the combustion chamber of the cylinder head 20b.

An exhaust pipe 32 is connected to the front wall of the cylinder head 20b of the engine 20. This exhaust pipe 32 is arranged so as to extend in the front-back direction of the vehicle in the area between the left and right frame members 15 and to the rear of the cylinder head 20b in the front-back direction of the vehicle. More specifically, the exhaust pipe 32 is brought out diagonally downward from the cylinder head 20b, then passes along the right side of the cylinder head 20b, and extends diagonally upward toward the rear of the vehicle. A muffler 33 is connected to the downstream end of the exhaust pipe 32. Viewed from above, this muffler 33 is arranged between the right side upper frame 15a and the right rear wheel 4b.

An air intake duct 34 which lets air into the transmission case 21a and cools the V-belt 23d, and an exhaust duct 35 which exhausts the air which has cooled the V-belt 23 from the transmission case 21a, are connected to the transmission case 21a.

The air intake duct 34 is arranged extending upward on the right side of the cylinder head 20b with regard to the widthwise direction of the vehicle. A supply port 34a is formed at the bottom end of the air intake duct 34 and an intake port 34b is formed at the top end. The supply port 34a is connected to an air intake port 21b formed protruding forward on the front wall of the transmission case 21a.

The air intake duct 34 is formed such that it extends to the right with regard to the widthwise direction of the vehicle from the air intake port 21b, then passes along the outside of the front suspension pipe 15f with regard to the widthwise direction of the vehicle, extending upward, and further passes along the inside of the upper frame 15a with regard to the widthwise direction of the vehicle.

The intake port 34b of the air intake duct 34 opens toward the front of the vehicle between the left and right upper frames 15a and below the handlebar member 8.

Figure 1:
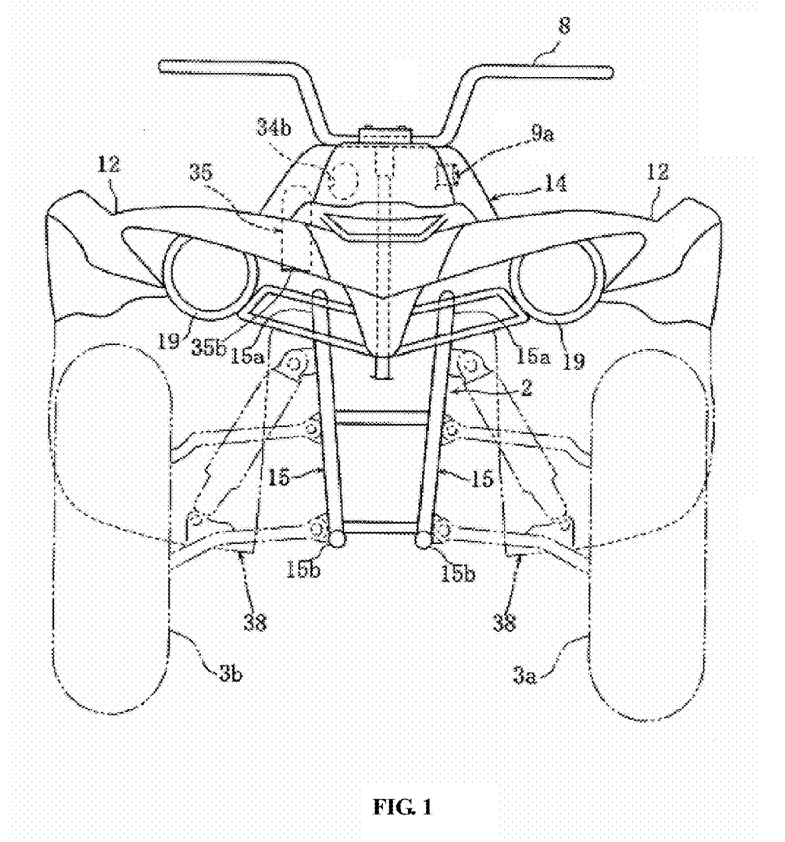
FIG. 1 is a front view of a vehicle according to an embodiment of the present invention.
Figure 2:
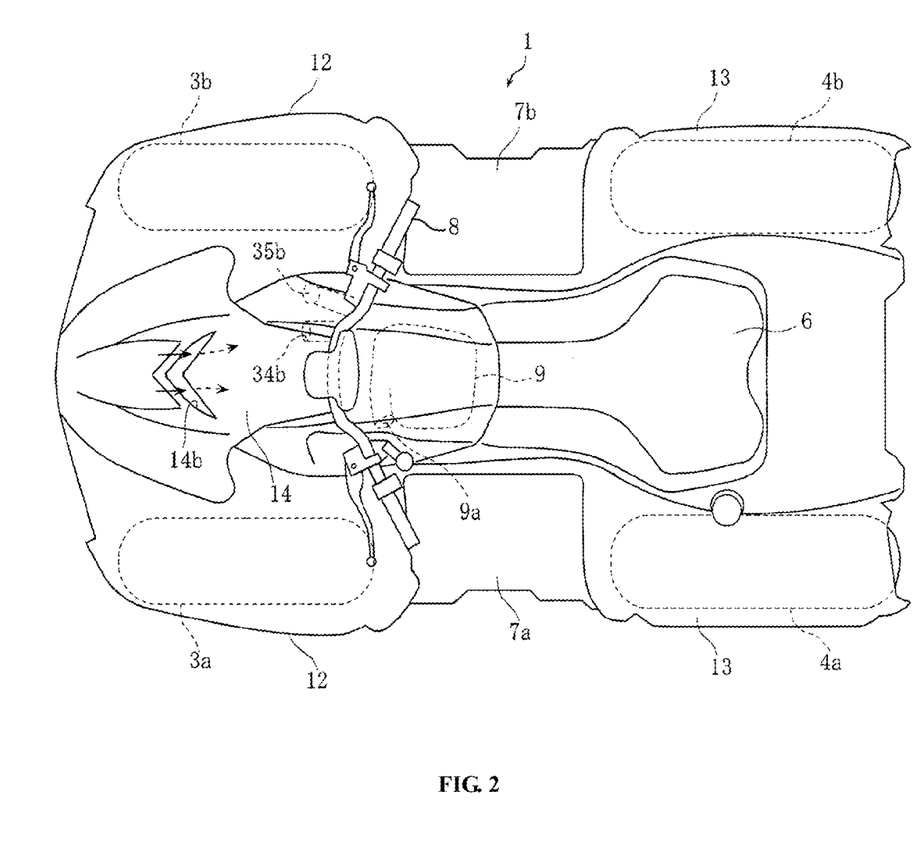
FIG. 2 is a plan view of said vehicle.
Figure 3:
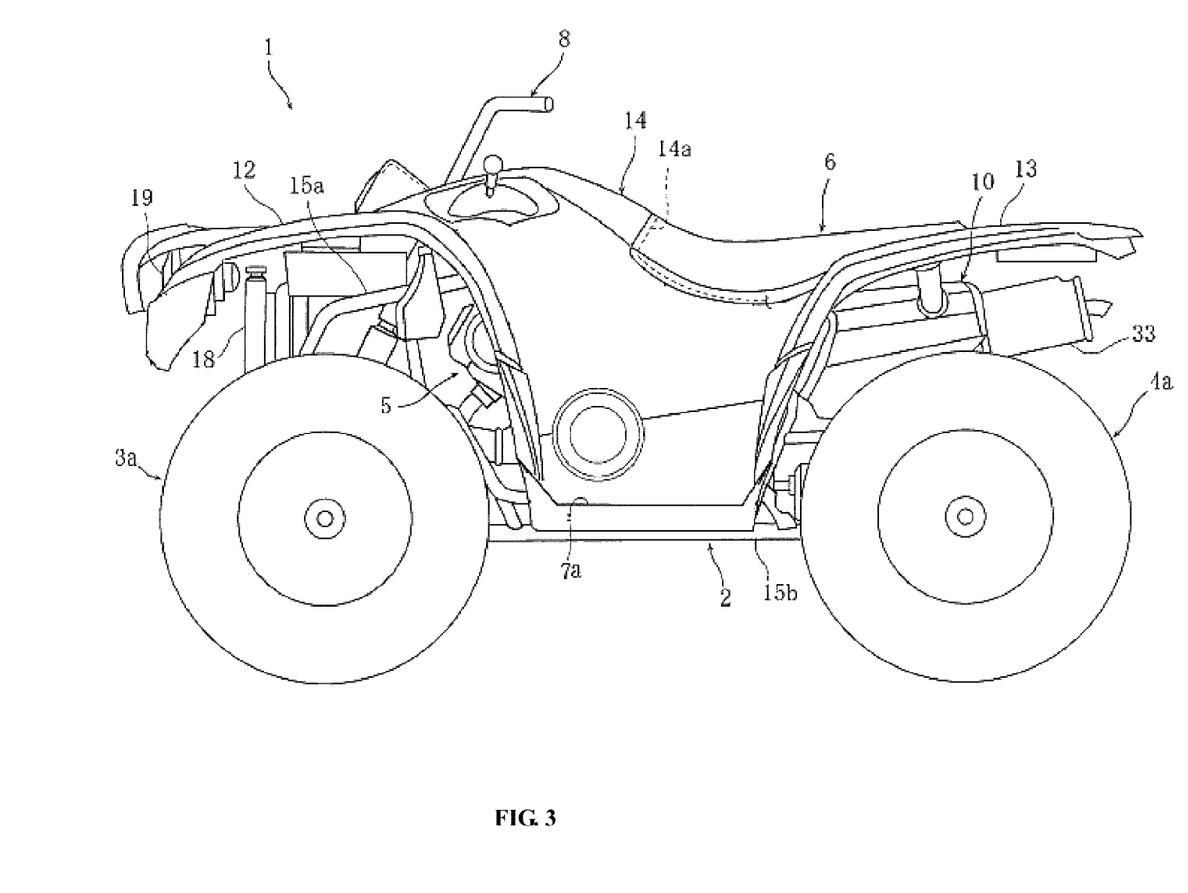
FIG. 3 is a left side view of said vehicle.
Figure 4:
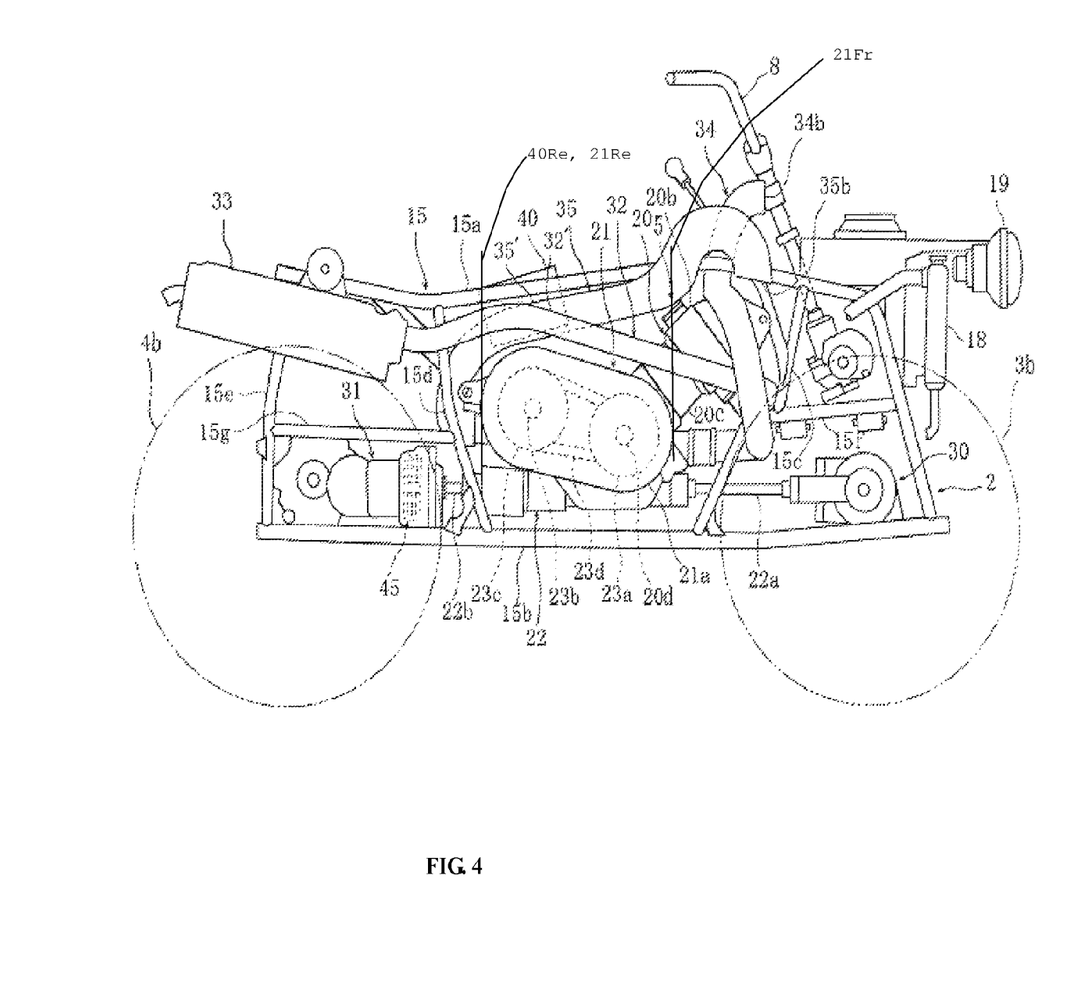
FIG. 4 is a right side view of said vehicle in a state where the vehicle body cover, front and rear fenders and the like have been removed.

An opening 14a which opens toward the front of the vehicle is formed in the vehicle body cover 14 to the front of the handlebar member 8 (see FIGS. 1 and 2). A portion of the air stream generated during travel which is taken in through this opening 14a flows to the air intake duct 34 and air cleaner 9.

The exhaust duct 35 is arranged so as to extend above the engine unit 5 in the front-back direction of the vehicle. An outlet port 35a is formed in the back end part of the exhaust duct 35, and an exhaust opening 35b is formed in the front end part. The outlet port 35a is connected to an exhaust opening 21c formed projecting rearward in the rear wall part of the transmission case 21a.

The exhaust duct 35 extends in the front-back direction of the vehicle such that the majority of it is located between the left and right frame members 15 and to the rear of the cylinder head 20b in the front-back direction of the vehicle. More specifically, the exhaust duct extends curving upward from the exhaust port 21c so as to go around the back of the transmission case 21a, and then extends along the inside of the exhaust pipe 32 with respect to the widthwise direction of the vehicle substantially in a straight line rising toward the front of the vehicle, and further extends outward with respect to the widthwise direction of the vehicle from the right upper frame 15a so as to move away from the air intake duct 34.

The exhaust port 35b of the exhaust duct 35 opens downward below the handlebar member 8, and is positioned lower than the intake port 34b of the air intake duct 34 and the aspiration port 9a of the air cleaner 9. The air discharged from the exhaust port 35b flows together with the air stream generated during travel toward the exhaust pipe 32 and muffler 33.

A storage box 41 is installed on the vehicle body frame 2. The storage box 41 is arranged so as to be located below the seat 6 and between the left and right frame members 15, and is openably covered by the seat 6.

Viewed from above, the storage box 41 is furthermore arranged between the air cleaner 9 and fuel tank 10 and offset to the left in the widthwise direction of the vehicle relative to the centerline C passing through the center of the vehicle 1 with respect to the widthwise direction.

Figure 9:
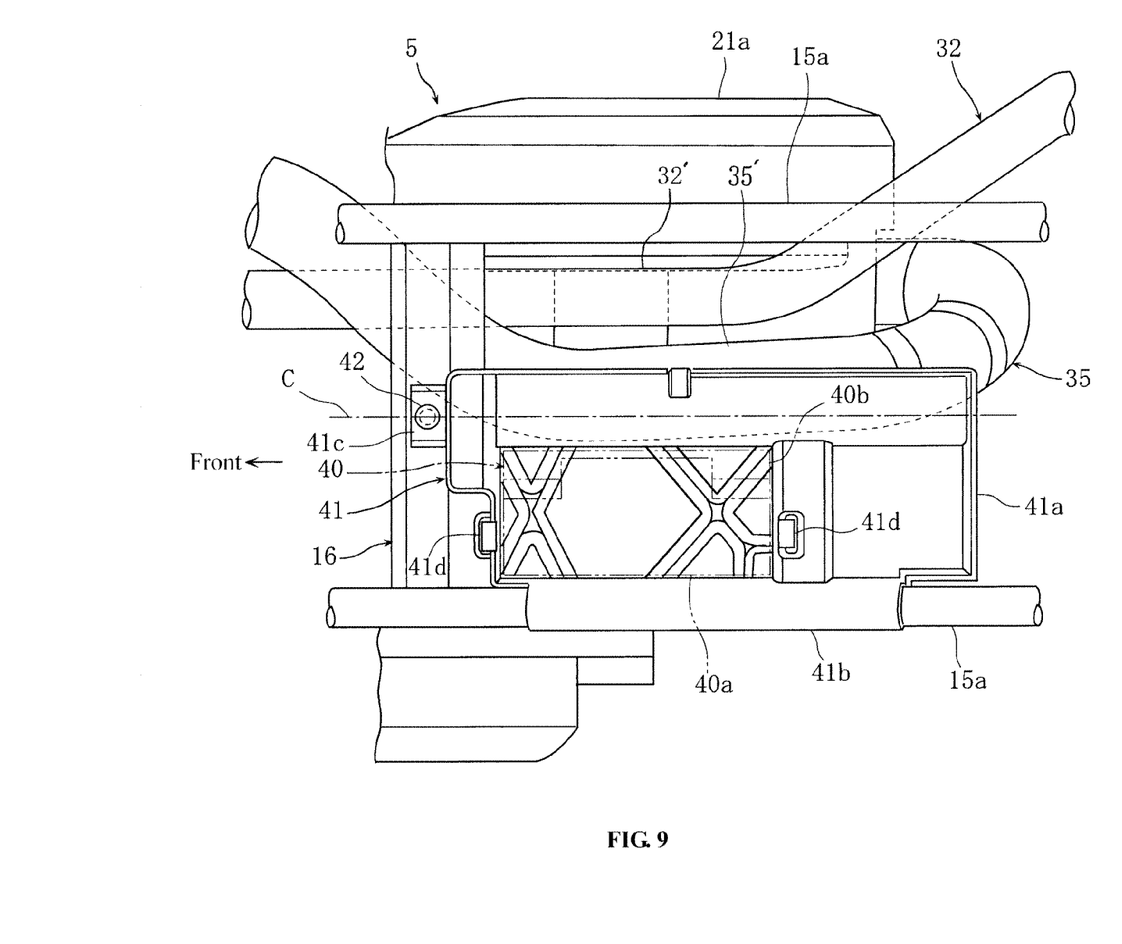
FIG. 9 is a plan view of a battery arranged on said vehicle body frame.
Figure 10:
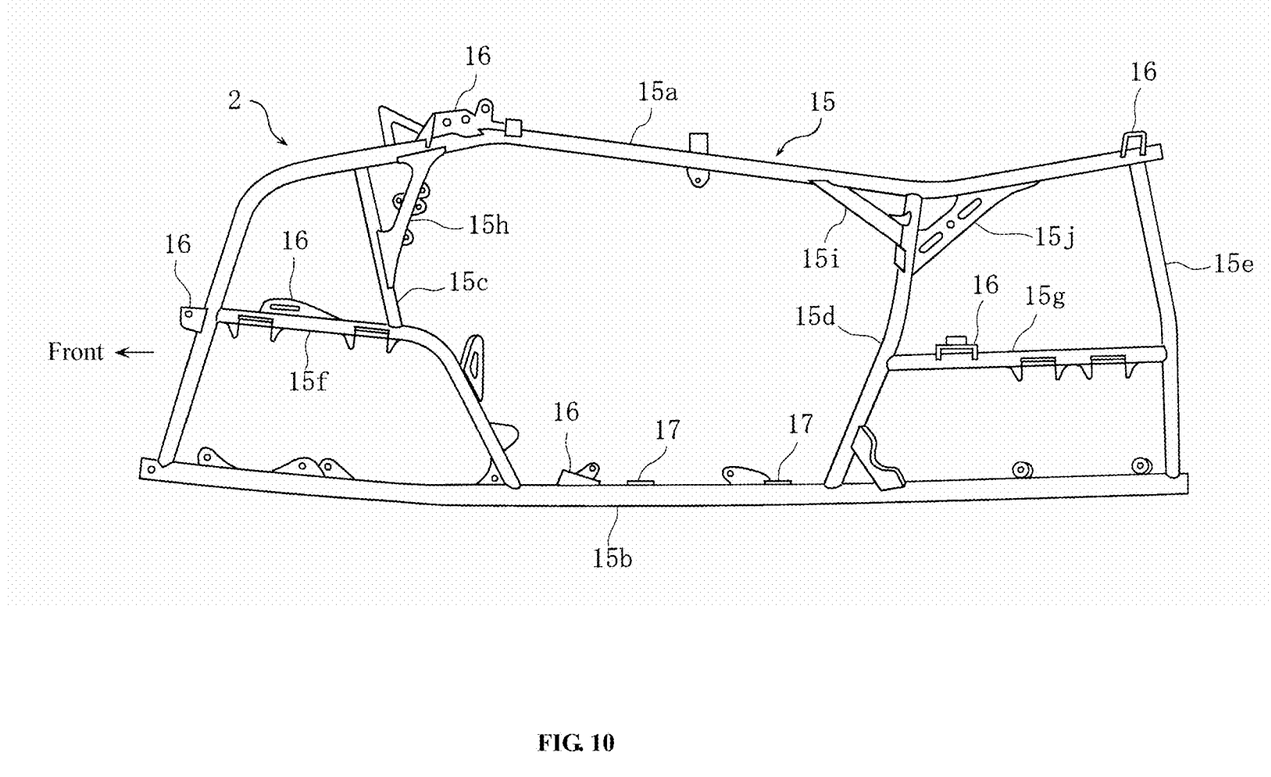
FIG. 10 is a left side view of said vehicle body frame.
Figure 11:
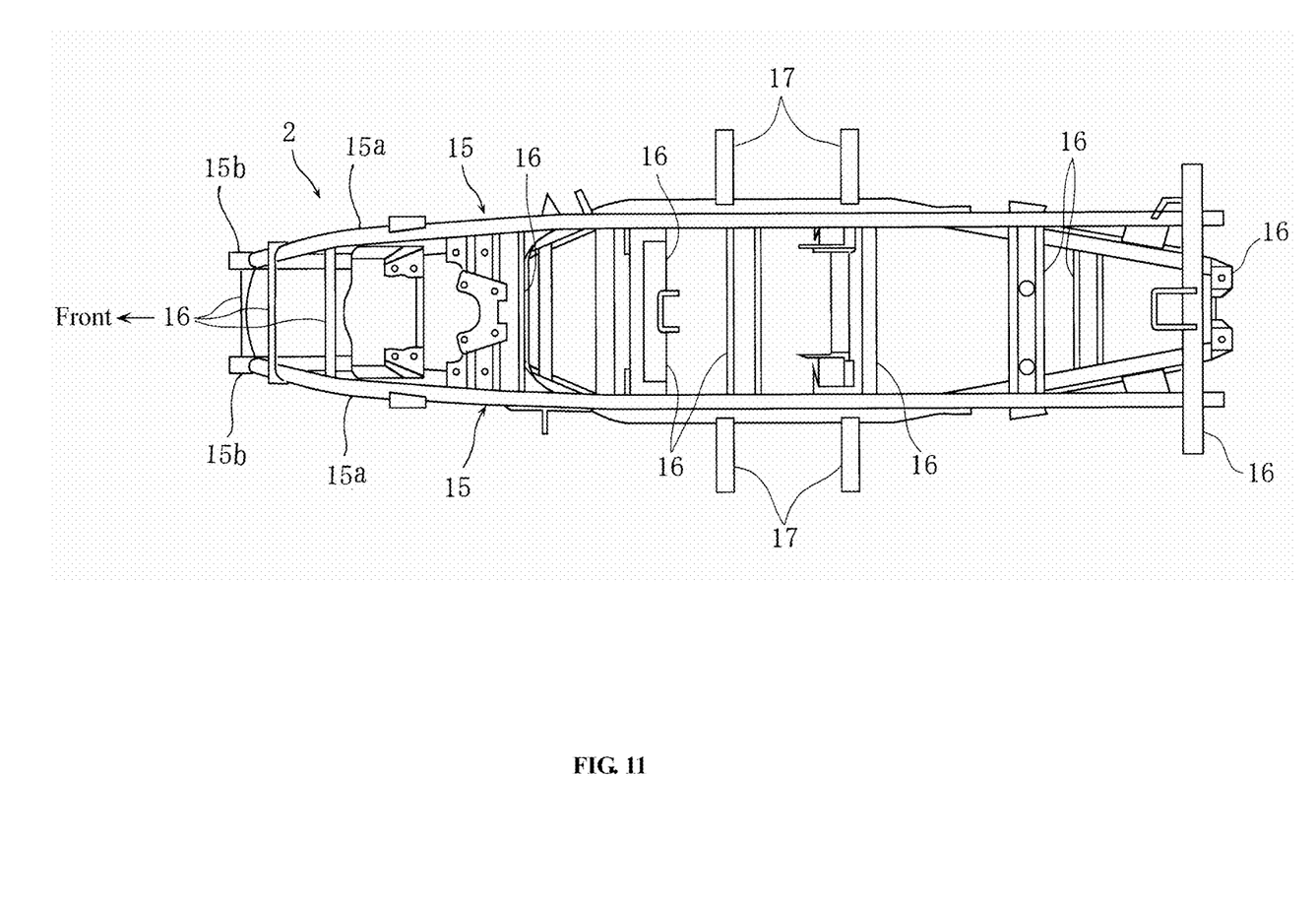
FIG. 11 is a plan view of said vehicle body frame.

The storage box 41 includes a box main body 41a which opens upward and houses electrical components such as relay switches and fuses and a tool kit (not illustrated); a latching part 41b with a circular arc shaped cross-section, formed in the left edge portion of the box main body 41a, which engages the left upper frame 15a; a mounting part 41c, formed in the front edge portion of the box main body 41a, which is secured to a cross-member 16 by means of a bolt 42 inserted from above; and band latching parts 41d (see FIG. 9).

The vehicle 1 includes a battery 40 supported on the vehicle body frame 2. The battery 40 is a power source for various types of electrical accessories, and is housed in the storage box 14 and secured to the storage box 41 by means of a band member (not illustrated) latched to a band latching part 41d.

The battery 40 is arranged between the left and right frame members 15 in plan view of the vehicle, so as to overlap the engine unit 6 from above.

The battery 40 is positioned to the rear of the cylinder head 20b in the front-back direction of the vehicle, and is arranged so as to overlap the rear part of the transmission case 21a with respect to the position in the front-back direction of the vehicle. Namely, the battery is horizontally offset from the transmission case. Additionally, the position of the battery 40 in the front-back direction of the vehicle preferably terminates at a horizontally offset position which parallels the rear edge of the transmission case as defined by the rear of the transmission case.

The battery 40 constitutes a rectangular parallelepiped, with its long sides 40a (left and right sides) being oriented in the front-back direction of the vehicle and its short sides 40b (front and rear sides) being oriented in the widthwise direction of the vehicle in plan view of the vehicle. The left and right sides of the battery 40 define a left battery plane 40L and a right battery plane 40R, respectively, and the front and rear sides of the battery define a front battery plane 40Fr and a rear battery plane 40Re, respectively, which each extends in the vertical direction.

The battery 40 is arranged offset to the left in the widthwise direction of the vehicle in relation to the centerline C. The exhaust duct 35 and exhaust pipe 32 are arranged to the right of the centerline C with respect to the widthwise direction of the vehicle. Furthermore, viewed from the side of the vehicle, a portion of the part 35' of the exhaust duct 35 which extends in the front-back direction and a portion of the part 32' of the exhaust pipe 32 which extends in the front-back direction overlap the battery 40.

The part 32' of the exhaust pipe 32 formed extending in the front-back direction of the vehicle and the part 35' of the duct 35 formed extending in the front-back direction of the vehicle are arranged offset in a direction opposite (right) to the direction (left) in which the battery 40 is offset with respect to the centerline C.

In one embodiment, the battery 40 is arranged so as to be located between the left and right frame members 15 and to the rear of the vehicle from the cylinder head 20b in plan view of the vehicle, so as to overlap the rear part of the transmission case 21a with respect to the position in the front-back direction of the vehicle, as well as being arranged such that its long side 40a is oriented in the front-back direction of the vehicle and its short side 40b is oriented in the widthwise direction of the vehicle. It thus becomes possible to install a large capacity battery 40 that can accommodate the recent demand for more sophisticated electrical accessories while having a compact vehicle body.

Namely, the battery 40, in plan view, forms a rectangular parallelepiped with one side 40b shorter than the other side 40a, and in one embodiment, the battery 40 is arranged with its short side 40b oriented in the widthwise direction of the vehicle and its long side 40a oriented in the front-back direction of the vehicle, and is arranged so as to overlap the rear part of the transmission case 21a as regards the position in the front-back direction of the vehicle. In other words, the battery 40 is arranged utilizing the space surrounded by the left and right frame members 15, the cylinder head 20b, and the transmission case 21a. Thus, even if the battery 40 is arranged between the left and right frame members 15 below the seat 6, there is hardly any need to widen the gap between the left and right frame members 15, allowing a compact body to be achieved as a result.

In one embodiment, the battery 40 is arranged so as to overlap the portion of the engine unit 6 to the rear of the cylinder head 20b from above in plan view of the vehicle, allowing the empty space above the engine unit 6 to be effectively utilized to arrange the battery 40. Furthermore, a body that is also compact in the front-back direction of the vehicle can be achieved.

In one embodiment, the exhaust pipe 32 connected to the cylinder head 20b is formed so as to extend in the front-back direction between the left and right frame members 15 and to the rear of the vehicle from the cylinder head 20b. Furthermore, the exhaust duct 35 connected to the transmission case 21a is formed so as to extend in the front-back direction in the area between the left and right frame members 15 and to the rear of the vehicle from the cylinder head 20b. Thus, the parts 32' and 35' of the exhaust pipe 32 and exhaust duct 35 extending in the front-back direction of the vehicle can be compactly arranged below the seat 6. As a result, a body compact in the widthwise direction of the vehicle can be achieved.

In one embodiment, the battery 40 is arranged offset to the left in the widthwise direction of the vehicle in relation to the centerline C passing through the center of the vehicle, and the part 35' of the exhaust duct 35 extending in the front-back direction of the vehicle and the part 32' of the exhaust pipe 32 extending in the front-back direction of the vehicle are arranged offset to the right in the widthwise direction of the vehicle, so the battery 40, exhaust duct 35 and exhaust pipe 32 can be arranged compactly without interfering with each other between the left and right frame members 15, allowing the body to be made more compact.

In one embodiment, a portion of the part 32' of the exhaust pipe 32 which extends in the front-back direction and a portion of the part 35' of the exhaust duct 35 which extends in the front-back direction are arranged so as to overlap the battery 40 when viewed from the side of the vehicle, thus allowing the battery 40, exhaust pipe 32 and exhaust duct 35 to be arranged compactly between the left and right frame members 15 without enlarging the vertical arrangement space. As a result, a body which is compact in the vertical direction of the vehicle can be achieved.

The invention claimed is:

1. A vehicle comprising:
a body frame having a length extending in a front-to-back direction of the vehicle and a width extending in a widthwise direction of the vehicle;
a pair of left and right front wheels carried by the body frame;
a pair of left and right rear wheels carried by the body frame;
an engine unit carried by the body frame and including a crankcase arranged between the pair of front wheels and the pair of rear wheels in the front-to-back direction of the vehicle, a cylinder extending upward from the crankcase, and a transmission case housing a V-belt transmission, the transmission case being arranged to one side of the crankcase in the widthwise direction of the vehicle, the transmission case including a front edge and a rear edge extending in the widthwise direction of the vehicle and defining a front transmission case plane and a rear transmission case plane, respectively, each extending in a vertical direction; and
a battery carried by the body frame, arranged rearward of the cylinder in the front-to-back direction of the vehicle, and including a left side and a right side extending in the front-to-back direction of the vehicle and a front side and a rear side extending in the widthwise direction of the vehicle, the left and right sides of the battery being longer than the front and rear sides of the battery, and each of the left, right, front, and rear sides of the battery define a plane extending in the vertical direction; wherein
the rear side of the battery overlaps the transmission case in the widthwise direction of the vehicle in a plan view of the vehicle; and
the battery and the transmission case are located on opposite sides of a centerline of the vehicle running through a widthwise center of the vehicle.

2. The vehicle according to claim 1, wherein the rear side of the battery overlaps the rear edge of the transmission case in the widthwise direction of the vehicle in the plan view of the vehicle.

3. The vehicle according to claim 1, wherein the battery is arranged above the engine unit such that at least a portion of the battery overlaps the engine unit in the plan view of the vehicle.

4. The vehicle according to claim 1, further comprising an exhaust pipe connected to the cylinder and extending rearward from the cylinder in the front-to-back direction of the vehicle, wherein the body frame includes a left frame member and a right frame member, and at least a portion of the exhaust pipe is arranged between the left frame member and the right frame member.

5. The vehicle according to claim 4, wherein the portion of the exhaust pipe is offset in the widthwise direction of the vehicle in relation to the centerline of the vehicle on one side of the vehicle opposite to a side of the vehicle where the battery is located.

6. The vehicle according to claim 4, wherein the portion of the exhaust pipe overlaps with the battery in the widthwise direction of the vehicle.

7. The vehicle according to claim 4, further comprising an intake duct connected to the transmission case, wherein at least a portion of the intake duct extends in the front-back direction of the vehicle between the left frame member and the right frame member.

8. The vehicle according to claim 7, wherein the intake duct is offset in the widthwise direction of the vehicle in relation to the centerline of the vehicle on one side of the vehicle opposite to a side of the vehicle where the battery is located.

9. A vehicle comprising:
a body frame having a length extending in a front-to-back direction of the vehicle and a width extending in a widthwise direction of the vehicle;
a pair of left and right front wheels carried by the body frame;
a pair of left and right rear wheels carried by the body frame;
an engine unit carried by the body frame and including a crankcase arranged between the pair of front wheels and the pair of rear wheels in the front-to-back direction of the vehicle, a cylinder extending upward from the crankcase, and a transmission case housing a V-belt transmission, the transmission case being arranged to one side of the crankcase in the widthwise direction of the vehicle, the transmission case including a front edge and a rear edge extending in the widthwise direction of the vehicle and defining a front transmission case plane and a rear transmission case plane, respectively, each extending in a vertical direction;
a battery carried by the body frame, arranged rearward of the cylinder in the front-to-back direction of the vehicle, and including a left side and a right side extending in the front-to-back direction of the vehicle and a front side and a rear side extending in the widthwise direction of the vehicle, the left and right sides of the battery being longer than the front and rear sides of the battery, and each of the left, right, front, and rear sides of the battery define a plane extending in the vertical direction; and
an intake duct and an exhaust duct each connected to the transmission case; wherein
the exhaust duct extends in the front-to-back direction of the vehicle;
the rear side of the battery overlaps the transmission case in the widthwise direction of the vehicle in a plan view of the vehicle; and
the exhaust duct and the battery are located on opposite sides of a centerline of the vehicle running through a widthwise center of the vehicle.

* * * * *